(No Model.)
W. FAIRCHILD.
MECHANISM FOR REVERSING SHAFTS.
No. 461,826. Patented Oct. 27, 1891.
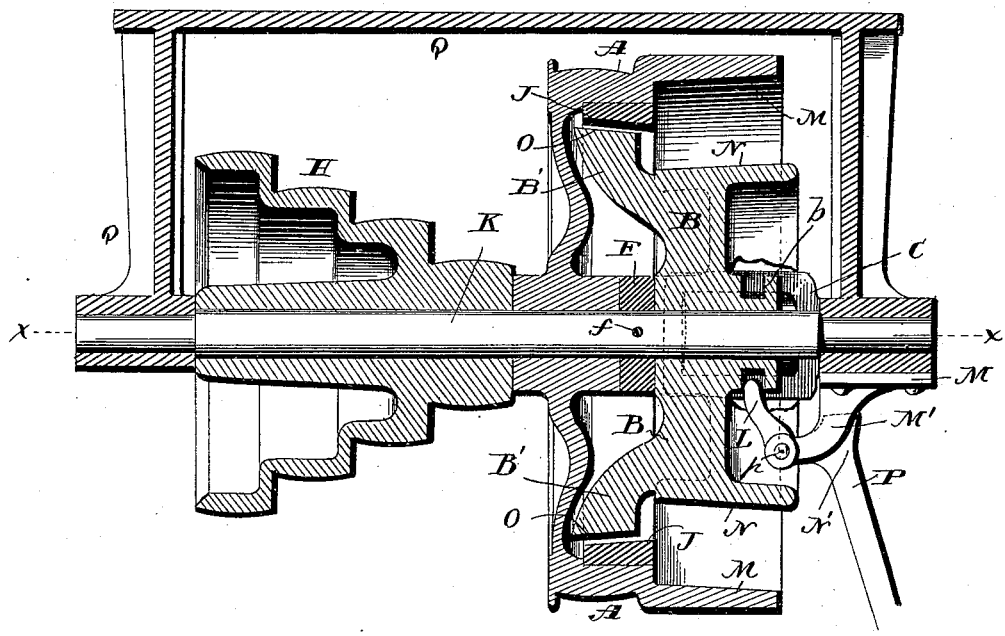
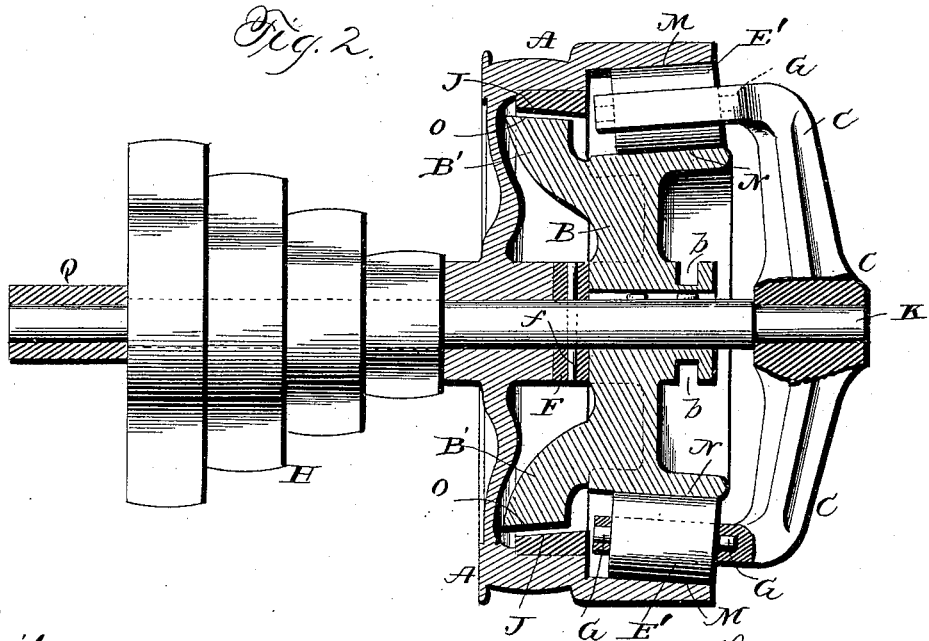

UNITED STATES PATENT OFFICE.

WILLIAM FAIRCHILD, OF ALBANY, NEW YORK.

MECHANISM FOR REVERSING SHAFTS.

SPECIFICATION forming part of Letters Patent No. 461,826, dated October 27, 1891.

Application filed June 12, 1891. Serial No. 396,013. (No model.)

*To all whom it may concern:*

Be it known that I, WILLIAM FAIRCHILD, a citizen of the United States, residing at Albany, in the county of Albany and State of New York, have invented certain new and useful Improvements in Mechanism for Reversing Shafts; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to mechanism for reversing shafts, being specially adapted for screw-thread-cutting machinery and like machinery that is required to be reversed in efficient operation.

The invention consists of the novel mechanism and combination of the parts, which will be hereinafter more fully described and claimed, and which are shown in the annexed drawings, in which—

Figure 1 is a central longitudinal section of a hanger or bearing and the appliances for reversing the motion of the same. Fig. 2 is a horizontal section on the line $x\ x$ of Fig. 1.

The hanger or bearing Q receives and supports the shaft K, which in the present case is a countershaft, and provided with the usual speed cone-pulley H, from which the power is taken in the ordinary manner. The pulley A, mounted loosely on the shaft K, so as to turn freely thereon, is, in the efficient operation of the invention, driven continuously in one direction by any of the well-known appliances, and is held from longitudinal movement on the said shaft K by cone-pulley H at one end of the hub and by the collar F at the other end of the hub, the said collar being secured to the shaft by the pin $f$ or other fastening means. The loose pulley A is provided with two integral working faces J and M. The clutch member B, mounted on the shaft K, and free to slide thereon, being held to and caused to revolve with the said shaft, is provided with two working faces N and O, corresponding with the working faces M and J of the pulley A. The working faces J and M flare in opposite directions, and the working faces O and N correspondingly flare in a reverse direction, the purpose being to vary the distance between the respective working faces J O and M N, whereby only two working faces will be in position to perform efficient service at the same time. The power-transmitting rollers E', located between the working faces M and N, are held in position for efficient work by a suitable support or yoke C, the latter having portions extending into the space between the said faces M and N and slotted to receive the said rollers E', the latter being retained in position by the journals G at their ends, obtaining bearings in the support C. The annular groove $b$ in the hub of the clutch member receives the end L of the shipper-lever P, by means of which the said clutch member is moved on the shaft K. The lever P is fulcrumed at $p$ on the bracket M', and has an arm N', which engages against the bracket, and by frictional engagement holds the lever in its adjusted position.

The working face J is formed on a ring or band, which is fitted and secured to the pulley A, and which can be replaced when worn. The working face O is formed on arms B', which are projected from the side of and form part of the clutch-pulley B. The support C may form part of or be secured to the bearing or hanger Q.

The operation of the invention is as follows: The pulley A is driven in one direction by any well-known instrumentalities, and runs loose on the shaft K. To cause the shaft and pulley A to travel in the same direction, the lever P is operated to bring the faces O and J in contact. To reverse the motion of the shaft K the lever is moved in the opposite direction, the faces O and J become disengaged, and the rollers E' are crowded against the faces N and M and revolve with the pulley A, and cause the clutch member B and the shaft K to revolve in a reverse direction to the motion of the pulley A. When the lever P is at a point between its two extreme movements, the pulley A revolves on the shaft K, and the latter is at rest. By reason of the peculiar arrangement of the parts shown the reverse motion of the shaft is faster than the direct motion. This is of advantage in screwcutting machinery, where it is a desideratum to return to the starting point as quickly as possible.

Having thus described my invention, what I claim to be new, and desire to secure by Letters Patent, is—

The combination, with the shaft, pulley A, the yoke and rollers supported thereby, and the clutch member B, of the lever P, the bracket M, arm L, and the arm N' on said lever and designed to frictionally engage said bracket, substantially as shown and described.

In testimony whereof I affix my signature in presence of two witnesses.

WILLIAM FAIRCHILD.

Witnesses:
CHARLES A. BEACH,
HENRY W. FAIRCHILD.